Oct. 27, 1936. C. W. HAZELETT 2,058,448
METALWORKING
Filed May 3, 1933 8 Sheets-Sheet 1

Fig. 2

CLARENCE W. HAZELETT
INVENTOR
BY Freeman and Weidman
ATTORNEYS

Oct. 27, 1936.　　C. W. HAZELETT　　2,058,448
METALWORKING
Filed May 3, 1933　　8 Sheets-Sheet 2

CLARENCE W. HAZELETT
INVENTOR
ATTORNEYS

Oct. 27, 1936.    C. W. HAZELETT    2,058,448
METALWORKING
Filed May 3, 1933    8 Sheets-Sheet 5

Clarence W. Hazelett
INVENTOR

By L. Freeman and Weidman
ATTORNEYS

Oct. 27, 1936.   C. W. HAZELETT   2,058,448
METALWORKING
Filed May 3, 1933   8 Sheets-Sheet 6

CLARENCE W. HAZELETT
INVENTOR
ATTORNEYS

Oct. 27, 1936.  C. W. HAZELETT  2,058,448

METALWORKING

Filed May 3, 1933  8 Sheets-Sheet 7

CLARENCE W. HAZELETT
INVENTOR

By Freeman and Weidman
ATTORNEYS

Patented Oct. 27, 1936

2,058,448

UNITED STATES PATENT OFFICE 2,058,448

METALWORKING

Clarence W. Hazelett, Rocky River, Ohio

Application May 3, 1933, Serial No. 669,216

15 Claims. (Cl. 22—200.1)

REISSUED

My invention relates to metal working, and among the objects thereof are the provision of new and improved methods, the provision of new and improved apparatus, and the provision of new and improved products.

In the drawings accompanying this specification and forming a part of this application, I have shown, for purposes of illustration, certain forms which my invention may assume.

In these drawings.

Figure 1:
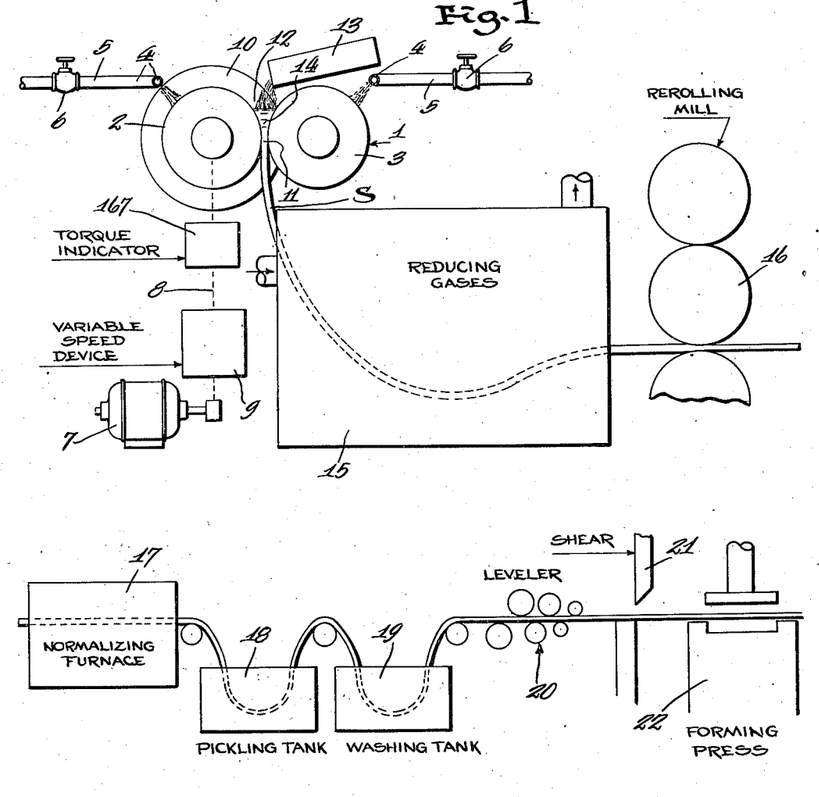
Figure 1 illustrates diagrammatically certain phases of my invention.

In Figure 1 I have shown a horizontal mill 1 comprising a pair of horizontal rolls 2 and 3 mounted in juxtaposed parallel relation; these rolls 2 and 3 are cooled by water delivered against the surfaces thereof through apertures in transverse ducts 4 receiving their supply through supply ducts 5 controlled by valves 6, and are driven by a motor 7 connected to the rolls 2 and 3 by any suitable transmission, indicated diagrammatically at 8.

Variable speed of rotation of the rolls 2 and 3, if desired, may be secured in any suitable manner, as by using for the motor 7 a motor which is variable in speed, or alternatively, by inserting in the drive 8 a variable speed device 9 of any suitable construction.

Mounted at the ends of the roll 2 are a pair of flanges 10 cooperating with the rolls 2 and 3 to define above the line 11 of nearest approach of the rolls 2 and 3 a space 12 for the reception of molten metal from a reservoir 13, to form in the space 12 a molten metal pool or lake 14.

The rolls 2 and 3 being below the temperature of fusion of the metal, the metal solidifies contiguous the rolls 2 and 3, and the solidified metal is carried down to the bight 11, and issues as the continuous strip S.

This strip S of course may be utilized in any desired manner, but I have in mind that it may be further processed continuously, as, for example, by the further operations illustrated in Figure 1.

That is, the strip S may be passed from the mill 1 through a chamber 15 containing reducing gases intended primarily to prevent the formation of oxide on the surfaces of the strip, and then may be passed through a re-rolling mill 16, to vary the thickness of the strip, to bring the strip accurately to gauge, to change the characteristics of the strip, or to effect any other action that may be desired. From the re-rolling mill 16 the strip may pass through a normalizing furnace 17, for heat treating the strip, and then through a pickling tank 18, containing acid or other solution suitable for removing any oxide present on the surfaces of the strip, and after that, through a washing tank 19, for washing the strip S after the emergence thereof from the pickling tank 18. Thereafter the strip may pass through a leveler 20, for leveling out any irregularities in the strip, and then may be cut into lengths by a shear 21, and in this form may be delivered to a forming press 22, to be formed and shaped as desired.

It will be understood, however, that these operations to some extent may be performed in an order other than that illustrated, and also, that any or all of these operations may be omitted, or other operations added, all as may be desired, but it is to be noted that such of these operations as are included may be performed on the strip while the strip retains its original heat, and without any re-heating, and further, that the passage of the strip immediately through the reducing chamber 15, and then through the re-rolling mill 16 before any further oxide has formed on the strip, is most effective to completely obliterate any trace of any surface cracks which may have existed in the strip as it issued from the mill 1.

With apparatus of this type the characteristics of the strip S will depend at least in large part on the extent of the solidification contiguous the rolls 2 and 3 relative to the width of the bight 11. With the solidification entirely insufficient the molten core will fuse through the solidified faces, and the metal will pour through the bight 11 as a molten stream. With somewhat greater extent of solidification the relatively thicker solidified faces will be of sufficient thickness to prevent the inner molten core fusing through, and the molten core will solidify between the solidified surfaces, uniting the solidified surfaces to itself, and thus to each other, and the strip S will issue as a cast strip.

I find, however, that this characteristic continues only up to the point where the extent of solidification exceeds the width of the bight 11, and that beyond this point there occurs this marked difference, that thereafter, by reason of the fact that the solidified metal delivered at the bight 11 is of greater thickness than the bight 11, the strip no longer is a cast strip, but is distinctly a rolled strip, possessing the characteristics of the usual rolled strip, and other valuable characteristics in addition.

I find that the extent of solidification contiguous the rolls 2 and 3, being dependent on the rate of solidification relative to the rate at which the strip is issued from the mill, is a result of various factors, including the nature of the metal itself, the temperature of the metal as delivered to the rolls, the length of the arc of contact of the metal with the rolls, the temperature of the rolls, and the speed of rotation of the rolls, and concurrently, that for any given metal I can maintain the desired extent of solidification by maintaining constant the relation between the various factors, and further, that I can maintain this relation constant by controlling any one or more of the factors, to compensate for variation in any one or more of the other factors.

For example, with any given metal I may maintain constant extent of solidification, despite variation in other factors, either by coordinately varying the speed of rotation of the rolls, or by coordinately varying the rate of solidification, and I may coordinately vary the rate of solidification by coordinately varying the arc of contact of the metal with the rolls, or by coordinately varying the temperature of the metal, or by coordinately varying the temperature of the rolls.

The speed of the rolls may be varied by variation in the speed of the motor 7, or by means of the variable speed device 9, and the arc of contact of the metal with the rolls may be varied by varying the depth of the molten metal lake 14 in the space 12 between the rolls 2 and 3 and the flanges 10, and the temperature of the metal may be varied by varying the temperature of the metal as supplied, or by preheating the metal as it is being supplied, or by heating the metal in the lake 14 in any suitable manner, such as by the passage of electric current therethrough either directly, or indirectly by inducing currents therein. On the other hand, the temperature of the rolls may be varied by varying the cooling thereof, as, for example, by varying the setting of the valves 6, to vary the amount of cooling fluid supplied by the ducts 4, or by varying the temperature of the cooling fluid itself, as by inter-mixing steam and water in varying proportion.

Considering the factors mentioned, the extent of solidification is increased by decrease in the speed of rotation of the rolls, or by increase in the rate of solidification, and the rate of solidification is increased by decrease in the temperature of the metal, by decrease in the roll temperature, and so far as I am aware, by increase in the arc of contact of the metal with the rolls.

However, any large variation in the temperature at which the metal is supplied, or in the temperature to which the rolls are cooled, is attended with considerable difficulty in practice, particularly since it seems desirable that the metal be supplied at a temperature considerably in excess of its melting point, and that the rolls be maintained at a temperature sufficiently low that the cooling fluid will not be so rapidly vaporized by contact with the rolls as to insulate the rolls with a blanket of relatively poor conducting vapor, and under these circumstances it appears that the control of the extent of solidification can best be accomplished either by controlling the speed of rotation of the mill or by controlling the arc of contact of the metal with the rolls.

In connection with control of the operation of the mill, I find that for any given mill, and any given metal, and any given width of the bight, the torque required to drive the mill increases with increase in extent of solidification of the metal, so that an indication of the torque required to drive the mill is an indication of the extent to which the metal is being solidified, and operation of the mill under substantially constant torque insures solidification of the metal in substantially constant extent.

However, regardless of how the control may be accomplished, coordination of the factors governing the extent of solidification is of extreme importance, since variations will materially effect the quality and characteristics of the product, even if small in extent, and of course, if larger, may result in appreciable damage and destruction, either by the passage of the metal through the rolls without solidification, or in the other direction, by over-solidification to an extent sufficient to wreck the mill, whereas, by suitable coordination it is possible to obtain and continuously maintain the desired condition, that is, solidification of the metal in a thickness somewhat greater than the width of the bight 11, whereby the metal is rolled by the rolls 2 and 3, and the strip S issues as a rolled strip.

Figure 2:
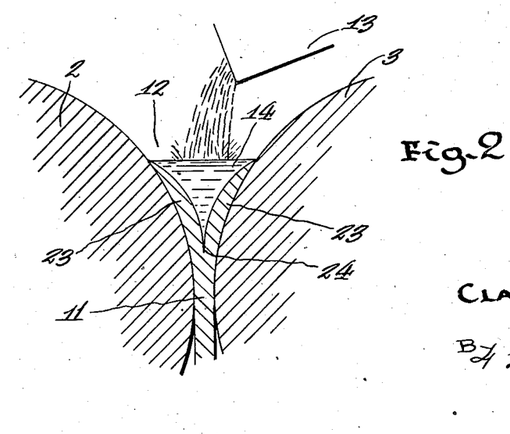
Figure 2 illustrates the action in rolling a strip directly from the molten metal.

In Figure 2 I have illustrated the action which occurs in this respect, showing the rolls 2 and 3, the molten metal lake 14 in the space 12 between the rolls 2 and 3 and the flanges 10 (see Fig. 1), and the solidification of the metal contiguous the rolls 2 and 3, into the strips 23, increasing progressively in thickness until at their meeting point 24 they are of a combined thickness materially greater than the width of the bight 11, and the further action of the rolls 2 and 3 is distinctly and definitely a rolling action, to reduce the thickness of the strips 23 to that defined by the width of the bight 11, so that, as is to be expected from the fact that the strip is rolled, the strip S issues in a thickness slightly greater than the width of the bight 11, and further, by the extrusion action consequent to the rolling action, at a linear speed materially in excess of the peripheral speed of the rolls 2 and 3.

From the foregoing it will be apparent that metal from a molten state may be formed directly into a solid continuous strip, having the characteristic of a rolled strip, and certain other valuable characteristics in addition, and further, that this strip may be treated and fabricated, even into a finished article, by a succession of instrumentalities operating continuously, while the metal still is hot.

In Figures 3 through 11 I have shown an embodiment of means for carrying out this process.

Figure 3:
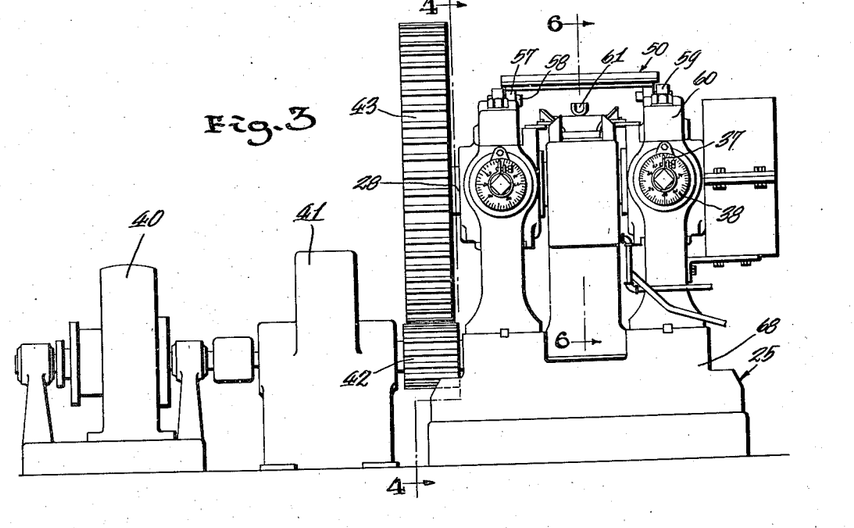
Figure 3 shows in elevation a mill particularly suited for the purposes of my invention.

This embodiment comprises a horizontal mill 25 having a frame 26 in which is mounted a first pair of bearings 27 carrying a first roll shaft 28 on which is mounted a first roll 29.

Also mounted in the frame 26 is a second pair of bearings 30, carrying a second roll shaft 31, on which is mounted a second roll 32, and this second pair of bearings 30 is mounted in the frame 26 for reciprocation toward and from the first pair of bearings 27, to reciprocate the shaft 31 and roll 32 toward and from the shaft 28 and roll 29, to vary the spacing between the rolls 29 and 32, and the width at the bight 33.

The reciprocation of each bearing 30 is controlled by a screw 34 coacting with a nut 35 mounted in the frame 26; each screw 34 carries at its foot a swivel connection 36, connecting the screw with the corresponding bearings 30, and at its head a pointer 37, cooperating with a dial 38 on the frame 26 to indicate at all times the position of the corresponding bearing 30.

Mounted between each bearing 27 and the contiguous bearing 30 is a coil spring 39, serving to hold the bearings and shafts and rolls in separated position, prior to the introduction of the metal between the rolls.

The shaft 28 is driven from an electric motor 40 through suitable reducing gearing 41 connected to a pinion 42 meshing with a gear 43 mounted on the shaft 28, and the shaft 31 is driven from the shaft 28 by means of inter-meshing gears 44 and 45 carried respectively by the shaft 28 and the shaft 31 and provided with elongated teeth adapted to remain in mesh for all permissible spacings of the rolls 29 and 32.

Figure 6:
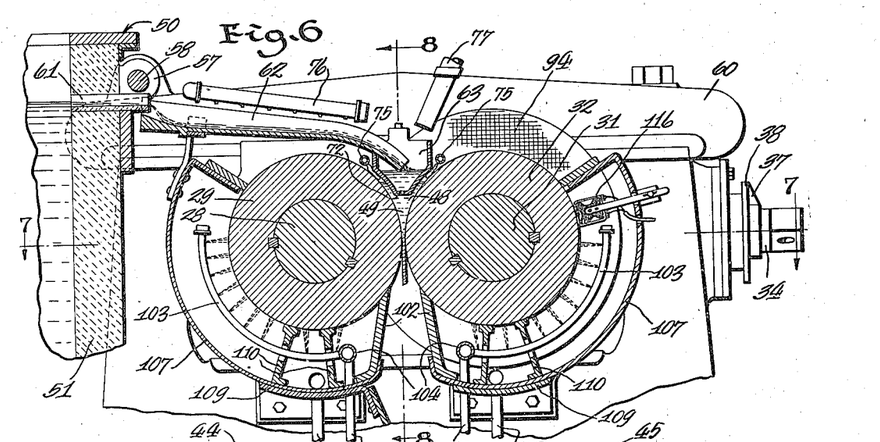
Figure 6 is an enlarged fragmentary vertical sectional view of the rolls and the related parts, taken on the line 6—6 of Figure 3.

Mounted on the roll 32 are a pair of flanges 46 secured in position by means of bolts 47 extending through the flanges into the roll, and these flanges 46, together with the rolls 29 and 32, form the space 48 in which is retained the molten metal lake 49.

Figure 7:
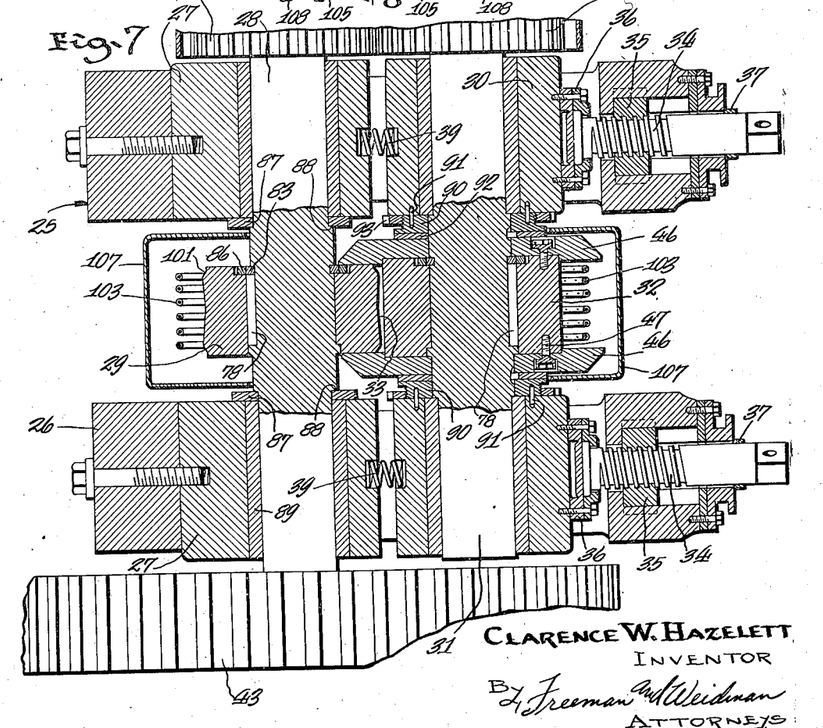
Figure 7 is a horizontal sectional view, taken on the line 7—7 of Figure 6.
Figure 8:
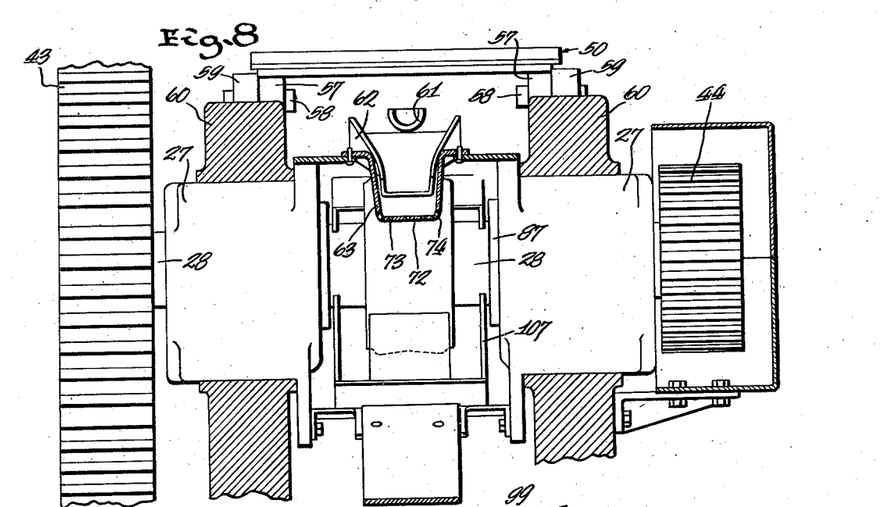
Figure 8 is a vertical sectional view, taken on the line 8—8 of Figure 6.

I prefer to form each roll of homogeneous material, without surface chilling or case hardening, and of a thickness not less than twice the maximum thickness of strip intended to be rolled, and then, to prevent contact between the male roll 29 and the flanges 46 acting to gouge splinters from the flanges 46, I prefer to make the flanges 46 of a material definitely softer than the material of the roll 29. To secure uniform gage across the width of a strip I find it desirable to concave one or both of the rolls 29 and 32, as shown in Figure 7 in connection with the roll 29.

Figures 4, 5:
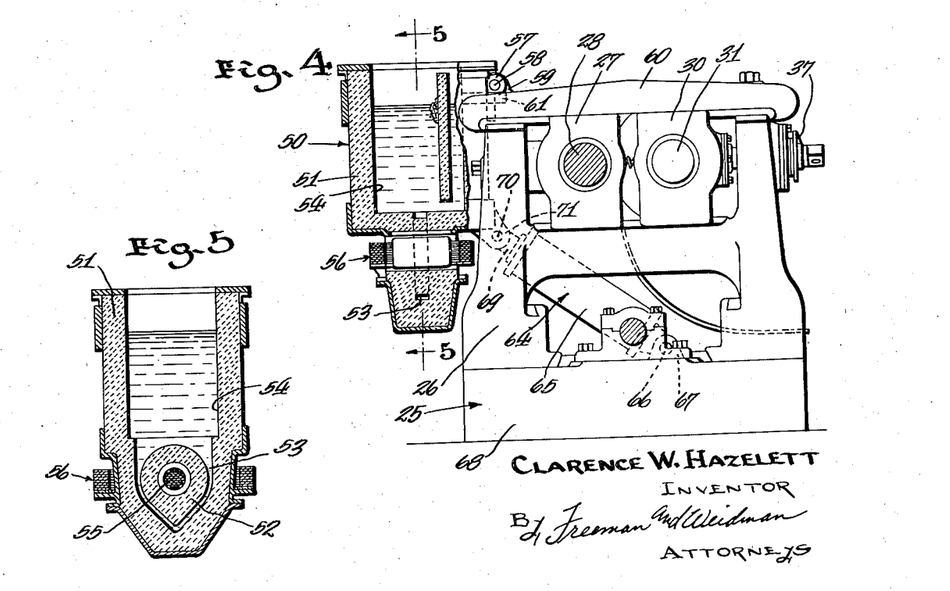
Figure 4 is a vertical section taken generally on the line 4—4 of Figure 3, but showing the ladle partly in section.
Figure 5 is a detail sectional view of the ladle, taken on the line 5—5 of Figure 4.

In this particular embodiment of my invention the molten metal is supplied to the lake 49 from a heated ladle or furnace 50.

The particular furnace herein disclosed comprises a body 51 of refractory material, in the lower portion of which is a core 52 which is also of refractory material and is of a size to define between itself and the body 51 a U-shaped passage 53 communicating at both upper ends with the open interior 54 of the furnace 50. Extending through the center of the refractory core 52 is the center leg 55 of the core 56 of a transformer, the primary winding of which, not shown, is connected to any suitable source of alternating current, and the secondary of which is constituted by the metal within the passage 53, so that the flow of current in the primary of the transformer induces a current in the metal within the passage 53, to heat this metal, and thus, by convection, to heat the entire metal within the furnace 50.

The furnace 50 is pivotally supported on the frame 26 of the mill 25 by means of a pair of ears 57 carried by the furnace 50 and connected by pivot pins 58 to cooperating ears 59 carried by the upper plate 60 of the mill frame 26, and the furnace 50 delivers its metal through a spout 61 which is positioned intermediate the ears 57 and pours into a trough 62 from which the metal is delivered to the lake 49 through a distributor 63.

The furnace is tilted by means of a hydraulic ram 64 having its cylinder 65 pivoted at 66 to lugs 67 on the base 68 of the mill frame 26, and having its piston 69 pivoted at 70 to lugs 71 on the frame of the furnace 50.

The distributor 63, into which the molten metal is discharged by the trough 62, is disposed in the space 48 between the rolls 29 and 32, intermediate the flanges 46, and with its bottom 72 lying below the normal surface of the molten metal lake 49, and discharges the metal into the lake 49 through intermediate apertures 73 and end apertures 74, all disposed in the bottom 72, midway between the rolls 29 and 32.

The distributor 63 acts as a skim box to skim from the molten metal any dross which may come down the trough 62 and then, by introducing the metal into the lake 49 below the surface of the lake, prevents the formation of any further dross, and in this way effectively prevents the introduction of any dross into the lake 49, and therefore, into the strip produced by the mill.

The introduction of the metal into the lake 49 below the normal surface of the lake also serves to introduce the metal quietly, and without surges, and this effect is augmented by the further fact that the distributor 63, and the metal contained therein, operate as a baffle, to damp out the kinetic head present in the metal as the metal comes down the trough 62, so that the metal enters the lake 49 almost solely in response to gravity, and therefore, quietly, and with no particular force or velocity, and in this connection I find it desirable that the total head of the metal entering the lake shall be less than the head of the lake. Further, the positioning of the apertures 73 and 74 midway between the rolls 29 and 32 introduces the metal into the lake 49 at that point where the lake is of the greatest depth, and the entering metal is least likely to contact with the solidified metal.

Under these circumstances the distributor 63 not only acts to insure purity of the metal within the lake 49, but also, to prevent any flow or eddying of the metal within the lake 49, likely to cause any irregularity in the solidification of the metal contiguous the rolls 29 and 32, or in any way interfere with uniformity of the solidification of the metal.

However, in order to assure further against the presence of dross in the metal of the lake 49, I may envelope the surface of the lake 49 in a reducing atmosphere, as by means of ducts 75 disposed on the two sides of the distributor 63, connected to a suitable source of reducing atmosphere, and provided with apertures by which the reducing atmosphere is discharged onto the surface of the lake 49, as indicated in Figure 6.

Under many circumstances I find it desirable that the metal shall be delivered to the lake 49 at a temperature perhaps 75 degrees Fahrenheit in excess of the melting point of the metal, in order that any trapped gases may have ample opportunity to escape, before the metal solidifies; I may achieve this result by delivering the metal to the trough 62 at a correspondingly high temperature. In this connection it may be noted that I may preheat the trough 62, or the distributor 63, or both, as by means of heaters 76 and/or 77, positioned respectively above the trough 62 and above the distributor 63, connected to a suitable source of gaseous fuel, and directing their flame respectively on the trough 62 and the distributor 63.

In order to prevent penetration of the metal of the lake 49 between the roll 29 and the flanges 46 carried on the roll 32, I find it desirable to reduce the spaces between the roll 29 and the flanges 46 to a minimum, and to that end, to center the roll 29 accurately between the flanges 46; as a matter of fact, this is particularly important when the metal is introduced at a temperature materially above its melting point, by reason of the rapid increase in the facility with which the metal penetrates, as the temperature is raised.

To this end I mount the rolls 29 and 32 fixedly on the shafts 28 and 31, support the shaft 28 against all axial movement, and then mount the shaft 31 for axial adjustment, as may be required to effect the desired centering of the roll 29 relative to the flanges 46.

Each of the rolls 29 and 32 is held against rotation on its shaft 28 or 31 by means of a key 78 received in cooperating keyways 79 and 80 disposed respectively in the shaft 28 or 31 and the roll 29 or 32. In assembling either roll upon its shaft the key 78 is placed in the shaft keyway 79, and the roll, positioned with its keyway 80 in alinement with the key 78, is moved longitudinally along the shaft until an annular roll shoulder 81 abuts an annular shaft shoulder 82, whereupon the roll is held against further axial movement in that direction. At this stage the key 78 is fully engaged in the cooperating keyways 79 and 80, holding the roll firmly against any rotation relative to its shaft. Thereupon the segments of a segmental ring 83 are seated in an annular shaft recess 84, but projecting radially to overlie an annular roll shoulder 85, whereupon the roll is held against retrograde movement longitudinally of the shaft, and therefore, against any relative movement axially of the shaft.

A resilient split ring 86 is then placed in position encircling the segments of the segmental ring 83, to lock these segments against any possible displacement.

The shaft 28 is held against axial movement relative to the mill frame 26 by means of collars 87 interposed between annular shoulders 88 on the shaft 28 and the bearing rings 89 fixed in the mill frame 26.

Figure 9:
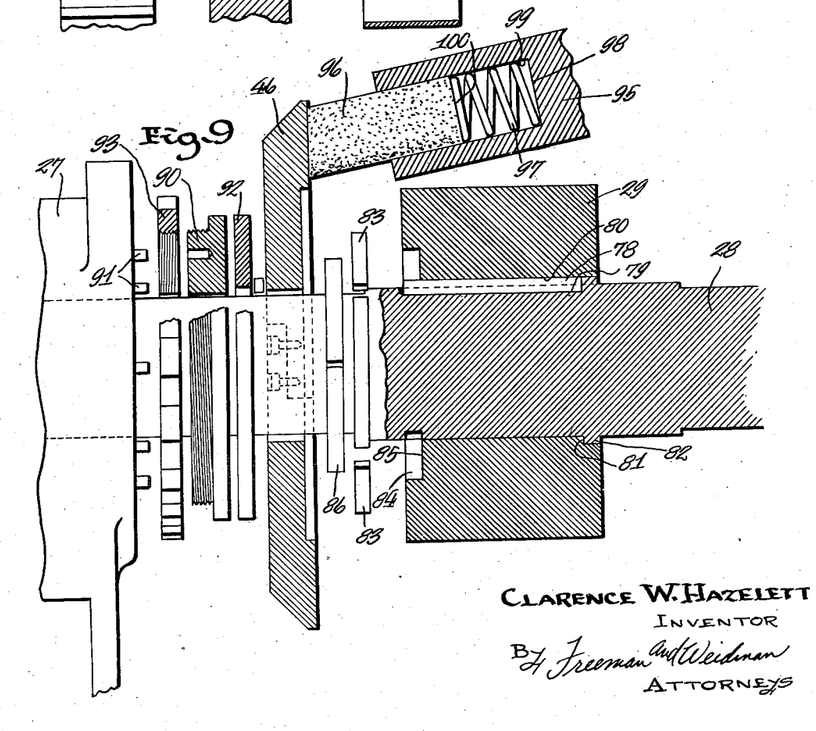
Figure 9 illustrates in detail the means for axially positioning the axially adjustable roll, and for coating the flanges.

The means for effecting longitudinal adjustment of the shaft 31 in the mill frame 26, and for holding the shaft 31 in its adjusted position, comprises thrust rings 90 held against rotation by pins 91 extending into the mill frame 26 and bearing against cooperating thrust rings 92 flanking the flanges 46 which in turn flank the two sides of the roll 32; the thrust rings 90 are moved along the axis of the shaft 31 to axially position the shaft 31 and the roll 32, and are held in adjusted position, by encircling rings 93 screwthreadedly engaging the thrust rings 90 and bearing against the sides of the mill frame 26.

In operation, the roll 29 being locked to the shaft 28, and the shaft 28 being fixed against longitudinal movement relative to the mill frame 26, and the roll 32 being locked to the shaft 31, the adjustment of the flanges 46 relative to the roll 29 is effected by rotation of the encircling rings 93, to project one of the thrust rings 90 and retract the other thrust ring 90, until the shaft and roll and flange assembly 31—32—46 has been moved to the desired position, with the roll 29 accurately centered between the flanges 46, and the shaft and roll and flange assembly 31—32—46 is held in this position, with the flanges 46 accurately centered on the roll 29, by the irreversibility of the engagement of the encircling rings 93 with the thrust rings 90.

Further to prevent entrance of metal between the roll 29 and the flanges 46, I may apply oil or similar material to the ends of the roll 29, or may provide an air blast blowing out from the spaces between the roll 29 and the flanges 46.

With the construction herein described, the flanges 46 exert an additional cooling effect adjacent the edges of the strip, which tends to cause at the edges of the strip an increased solidification of the metal relative to the extent of solidification of the metal centrally of the strip. This not only tends to produce lack of uniformity in the strip, but further, tends to form adjacent the flanges 46 masses of solidified material which will accumulate to a considerable size before they pass between the rolls 29 and 32, and then, in passing between the rolls 29 and 32, will exert a pressure on the rolls which may crack a roll, break a bearing, or cause other injury to the mill, and to guard against this accumulation of solidified metal adjacent the flanges 46 I find it desirable to provide additional traction at the ends of the rolls; I find that this may be done by roughening the edges of the rolls 29 and 32, but roughening the edges of the rolls 29 and 32 produces a corresponding roughening of the surface of the strip, which in many instances is objectionable, wherefore I prefer to provide this additional traction by having the inner faces of the flanges 46 relatively rougher, as indicated at 94 in Figure 6.

To the same end I find that it also is desirable under certain circumstances to coat the inner faces of the flanges 46 with material which will prevent freezing of the metal to these inner faces of the flanges 46, and to this end I provide means for continually applying such material to the inner faces of the flanges 46, as shown particularly in Figure 9, wherein I have disclosed a holder 95 in which is positioned a graphite block 96 spring pressed against the inner face of the flange 46 by means of a coil spring 97 interposed between the base 98 of the block receiving recess 99 of the holder 95 and the base 100 of the block 96.

However, I prefer also to provide means to compensate for the increased cooling at the edges of the rolls, and I find that I may do this conveniently by forming the end apertures 74 of the distributor 63 of greater size than the intermediate apertures 73, so that a greater proportion of the molten metal is introduced into the lake 49 at the ends of the lake, adjacent the flanges 46, and the lake is additionally heated at the ends thereof, so that additional cooling is required adjacent the flanges 46.

Or I may accomplish this compensation by undercutting one or both of the rolls 29 and 32, as indicated at 101 on the roll 29, whereby the strip is formed of increased thickness at its edges, and the increased cooling adjacent the flanges 46 is absorbed.

While either of these methods is satisfactory, in actual practice I prefer to accomplish the compensation by the coordinate use of both methods, as herein illustrated.

Finally, just below the bight 33 I provide scrapers 102, bearing against the rolls 29 and 32 and effective to separate the strip from either of the rolls to which it may tend to adhere.

Figure 10:
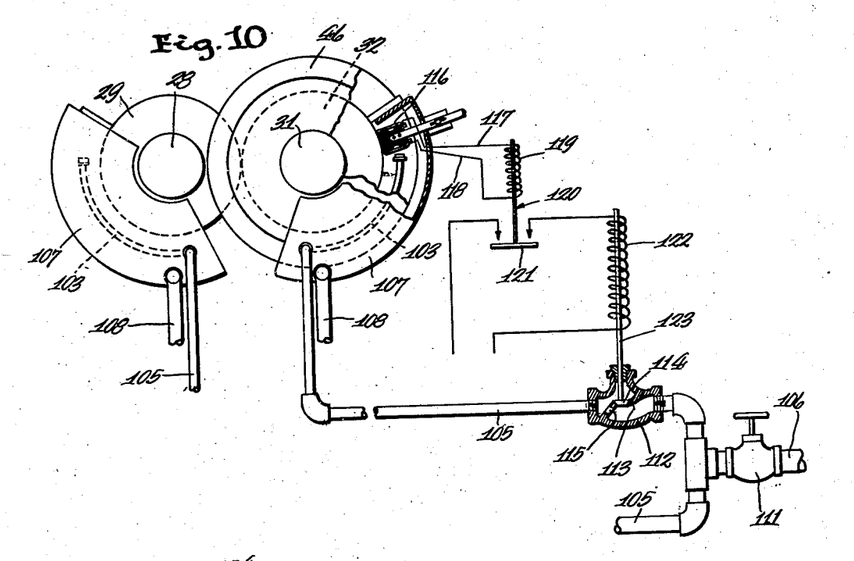
Figure 10 illustrates the system for supplying the cooling water to the rolls.

To cool the rolls 29 and 32 I provide two series of arcuate pipes 103 extending beneath and to the rear of the rolls, apertured to spray cooling water against the surfaces of the rolls, and fed from headers 104 to which the cooling water is supplied by supply pipes 105; to carry away the cooling water I overlie these portions of the rolls 29 and 32 with housings 107 in which the cooling water is collected, and from which the cooling water is discharged through waste ducts 108, and I conveniently support these housings 107 by attaching their lower ends to cross bars 109 supported from the bearings 27 and 30.

The housing 107 for the roll 29 also cooperates with the distributor 63 to removably support the trough 62.

Under certain circumstances there is a tendency for vapor from the cooling water to adhere to the surfaces of the rolls, and to form on the surfaces of the rolls a sheathing blanket insulating the rolls from the subsequent jets of cooling water, and therefore, reducing the cooling action of the subsequent jets; to overcome this tendency I may provide wipers wiping the rolls between successive rows of jets, such as the wipers 110 shown in Figure 6 as supported from the housings 107 and as wiping the rolls subsequent to the first two rows of jets.

To this same end I prefer to maintain the rolls under 400 degrees Fahrenheit.

The supply of cooling water may be controlled manually by a manually operated valve 111 interposed in a main supply duct 106 from which the branch supply ducts 105 are supplied, but I prefer to use this manually operated valve 111 merely as a shut-off valve, to completely shut off the supply of cooling water when the mill is not in operation, and during operation of the mill to control the supply of cooling water to the rolls 29 and 32 by control valves 112 interposed in the branch supply ducts 105 and actuated automatically in response to the temperature of the rolls 29 and 32.

Each valve 112 is provided in its web with a valve seat 113 in which seats a valve head 114, but the web of the valve also is provided with an aperture 115 acting as a by-pass to permit a base quantity of cooling fluid to flow continuously, so that raising the valve head 114 does not institute the flow of cooling water, but merely increases the volume in which the cooling water is furnished.

It will be understood that under these circumstances the base amount of cooling water, permitted to flow by the by-pass aperture 115, is made somewhat less than the amount required to cool the roll, and the additional cooling water requisite for proper cooling of the roll is then furnished by intermittent opening of the valve 114.

To make this control automatic I provide for each valve 112 a control comprising a thermo-couple 116 disposed in contact with the corresponding roll at a point above the area where cooling water is sprayed onto the roll, and therefore, responsive at all times to the lowest temperature obtaining in the roll.

The conductors 117 and 118 leading from the thermo-couple 116 are connected to the two ends of the coil 119 of a relay 120 arranged upon sufficient energization of the coil 119 to close the relay switch 121 and complete the circuit through a solenoid 122 whose armature 123 is connected to the valve head 114, to open the valve 112 whenever the solenoid 122 is energized, and to hold the valve 112 open so long as the solenoid 122 continues to be energized, or in other words, so long as the current in the coil 119 of the relay 120 is sufficient to maintain the relay switch 121 in closed position, and therefore, since the current in the coil 119 is the current of the thermal circuit, and the current of the thermal circuit is responsive to the temperature of the thermo-couple, so long as the minimum temperature of the roll exceeds a predetermined amount. Then when the temperature of the roll falls below this predetermined amount, the valve 112 closes, to cut off the additional cooling water, and remains closed until the temperature of the roll again exceeds the predetermined amount, whereupon the valve 112 again opens, to supply additional cooling water, to reduce the temperature of the roll, and the cycle is repeated.

While I have shown this cooling water control only in connection with the roll 32, it will be understood that it is employed also in connection with the roll 29, and further, that the control employed in connection with the roll 29 is in all respects a duplicate of the control disclosed in connection with the roll 32.

Figure 11:
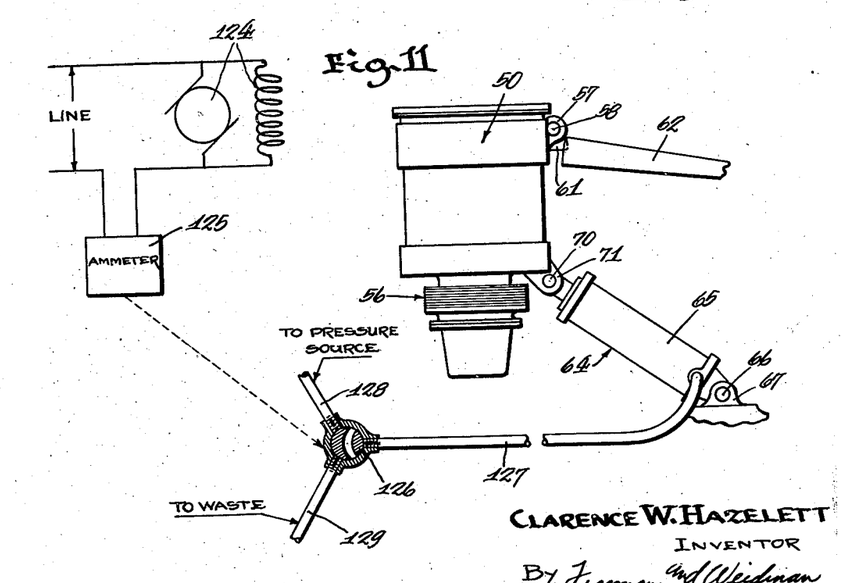
Figure 11 illustrates one method of controlling the operation of the apparatus.

In Figure 11 I have indicated more or less diagrammatically one arrangement for controlling the general operation of the mill.

This arrangement contemplates driving the rolls 29 and 32 by a substantially constant speed motor such as the shunt motor 124, so that the current required by the motor is responsive substantially directly to the torque required to operate the mill, and therefore, to the torque required to roll the strip under the conditions of extent of solidification then existing, whereby an ammeter 125 interposed in the circuit of the motor 124, indicating directly the current required by the motor 124, indicates also the torque required to drive the mill, and therefore, the extent of solidification which is obtaining.

This arrangement contemplates also the actuation of the ladle tilting ram 64 under control of a three-way valve 126 connected to a duct 127 leading to the cylinder 65 of the ram 64, and arranged to connect this duct 127 either to a duct 128 leading to a suitable source of hydraulic pressure, or alternatively, to a waste duct 129.

This arrangement also considers that for any given metal, and any given width of the bight, with constant speed of rotation of the rolls, the extent of solidification may be controlled by controlling the depth of the lake 49, to control the arc of contact of the metal with the rolls.

And with regard to these circumstances, the operator actuates the control valve 126 in accordance with the indications of the ammeter 125, raising the ladle faster if the current required by the motor 124 decreases, to increase the depth of the lake and the extent of solidification, and decreasing or discontinuing the raising of the ladle 50 if the ammeter 125 indicates increase in current to the motor 124, thus to lower the height of the lake 49, and to decrease the extent of the solidification.

In this connection, I find that for metals such as zinc, brass, and steel, it is desirable that the power used by the mill shall be not less than one horse power per foot of width of strip per foot per minute peripheral speed of the mill.

Considering that the ammeter 125 indicates immediately any change in the current required by the motor 124, and therefore, any change in the extent of the solidification, it has been found that with this arrangement an experienced operator may maintain the extent of solidification of the metal well within the limits of the range over which satisfactory sheet is produced by the mill.

This arrangement, with its manual control of the tilting of the furnace 50, also is particularly advantageous in connection with operation of the mill to produce a continuous sheet requiring more metal than can be contained in the furnace 50 at a single charge, so that the continued operation of the mill requires refilling of the furnace 50, and thereby, rapid movement of the furnace 50 to retract it into position to receive a further charge, and to return it to position to resume pouring of metal into the trough 62, before the level of the lake 49 has decreased below the minimum level at which the mill continues to produce sheet of the desired characteristic.

Figure 12:
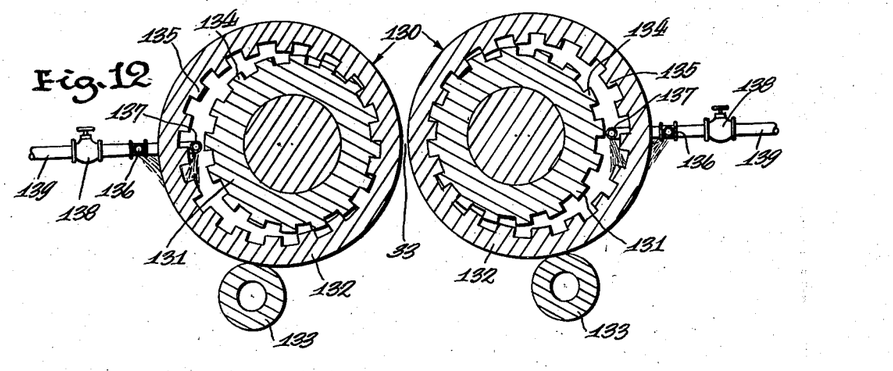
Figure 12 shows an alternative form of roll construction.

In Figure 12 I have shown an alternative roll construction comprising rolls 130 each having an inner core 131 surrounded by an outer shell 132 having an internal diameter considerably in excess of the outside diameter of the core 131 and supported by a supporting roller 133 mounted in any suitable manner from the frame 26 of the mill 25. It will be understood that the shell 132 and the core 131 are in engagement at the bight 33, and in order to drive the shell 132 positively from the core 131, the core 131 and the shell 132 may be provided respectively with external teeth 134 and internal teeth 135, arranged to mesh at the point of engagement of the shell and the core, at the bight 33, or the teeth 134 and 135 may be omitted.

With this construction the shell may be cooled both externally and internally by cooling water issuing from nozzles 136 and 137 located respectively outside the shell 132 and in the space between the shell 132 and the core 131, at a point directly opposite the point of engagement of the core 131 and the shell 132. The flow of cooling fluid to the nozzles 136 and 137 may be controlled manually by valves 138 located in the supply ducts 139, or may be controlled automatically, as hereinabove described.

By means of this construction the rolls 130 present substantially solid and unyielding surfaces to the metal at the bight 33, yet at the same time are constructed to facilitate cooling of the shell, both by reason of the ability to cool both internally and externally, and also, by reason of the fact that the shell, being solidly backed by the core at the point of stress, may be relatively thin, to facilitate the cooling thereof.

This construction also has the further advantage, that the relatively inexpensive outer shells may be replaced without replacement of the entire roll structure.

Figure 13:
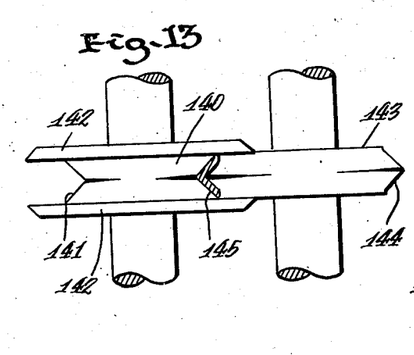
Figure 13 illustrates a roll construction adapted to produce strip of L cross section.
Figure 14:
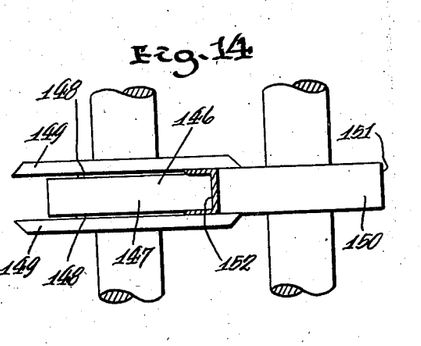
Figure 14 illustrates a roll construction adapted produce strip of U cross section.
Figure 15:
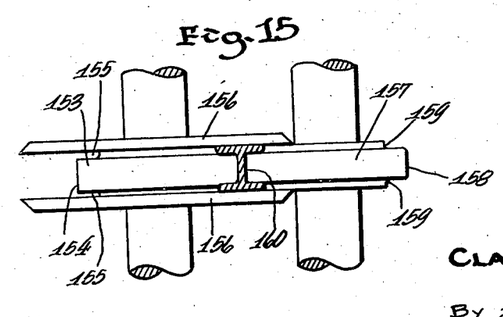
Figure 15 illustrates a roll construction adapted to produce strip of I cross section.

In Figures 13 through 15 I have shown alternative shapes of forming rolls, for rolling strip of various cross sections.

The roll 140 of Figure 13 is provided with a V-shaped recess 141, and with flanges 142, and the cooperating roll 143 is provided with a V-shaped projection 144, cooperating with the V-shaped recess 141 of the roll 140 to define a V-shaped opening 145 at the bight of the rolls, so that the rolls of Figure 13 will produce a strip of V-shaped cross section.

In Figure 14 the roll 146 is provided with a relatively flat central portion 147, and at the edges thereof, just within the flanges 149, with relatively deep recesses 148, and the cooperating roll 150 is formed with a flat face 151 of a width substantially equal to the entire distance between the flanges 149, whereby there is defined at the bight of the rolls a U-shaped space 152, and the rolls of Figure 14 produce a strip of U-shaped cross section.

In Figure 15 the roll 153 is provided with a relatively flat central section 154, and with relatively deep recesses 155 on each side thereof, just within the flanges 156, and the cooperating roll 157 also is provided with a relatively flat central portion 158 flanked by relatively deep recesses 159, so that the rolls of Figure 15 define at the bight an I-shaped space 160, and produce a strip of I-shaped cross section.

It will be understood of course that the strip may be formed of any other desired cross section, merely by proper configuration of the surfaces of the rolls, and accordingly, that the sheet, V, U, and I cross sections herein shown, are merely illustrative of the cross sections which can be produced.

Figures 16, 17:
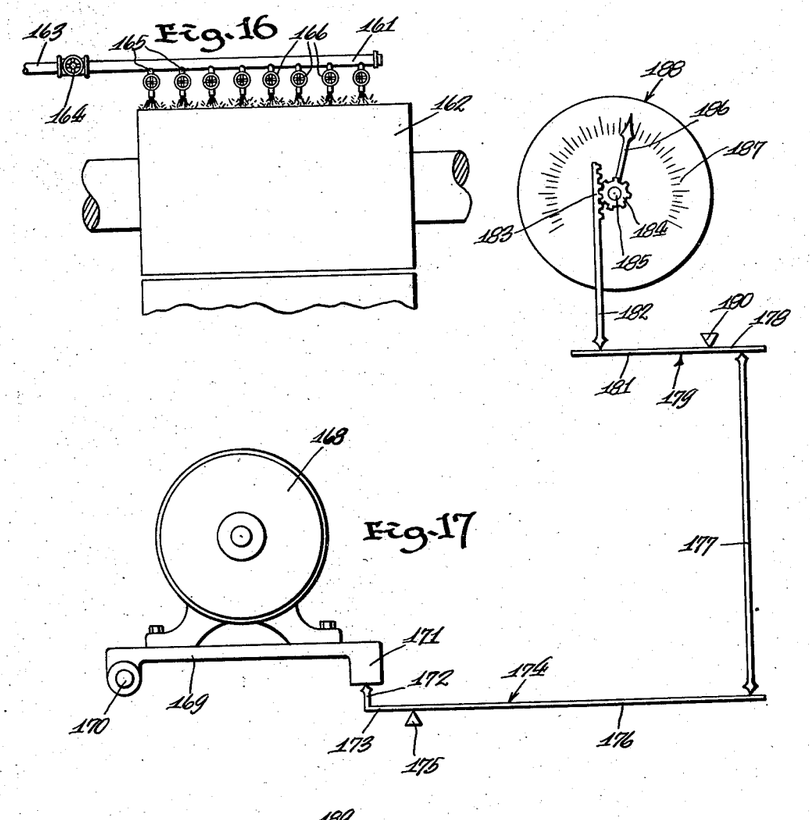
Figure 16 illustrates a modification of the cooling water system, to provide variable cooling at different points along the length of the rolls.
Figure 17 illustrates an alternative method of determining the torque being required to operate the mill.

In Figure 16 I have shown means for cooling the rolls in varying degree at various points along the length of the rolls, and I find this desirable under certain circumstances, and with certain types of rolls, for example, in order to control the rolls against undue distortion, or alternatively, to compensate for the additional cooling effect of the flanges by decreasing or omitting the cooling of the rolls adjacent the flanges. The particular means disclosed in Figure 16 comprises a cooling water manifold 161 extending parallel to the roll 162, receiving fluid from a main duct 163 under control of a manual valve 164, or alternatively, under control of an automatic control, as hereinabove described, whichever may be desired, and then discharging the cooling fluid against the roll 162 through a plurality of branch ducts 165 spaced along the length of the manifold 161 and each controlled by an individual branch valve 166, whereby the relative amount of cooling water in the various branch ducts 165 may be controlled and proportioned as may be desired.

In controlling the operation of the mill manually I may substitute for the ammeter indication of torque and extent of solidification a direct torque indication, and for this purpose may interpose a suitable torque indicating device 167 in the drive 8 from the motor 7 to the rolls 2 and 3, or, in the alternative, may employ the torque indicating mechanism disclosed in Figure 17, wherein the mill motor 168 is mounted on a base 169 pivoted at one end at 170 and resting at the other end 171 on a knife edge 172 carried on the short arm 173 of a lever 174 fulcrumed at 175 and having its long arm 176 connected by a link 177 to the short arm 178 of a lever 179 fulcrumed at 180 and having its long arm 181 engaging a reciprocating bar 182 carrying a rack 183 which cooperatively engages a pinion 184 mounted on a shaft 185 to which is secured an indicator arm 186 moving over the scale 187 of an indicator dial 188. Depression of the free end 171 of the base 169 is opposed continually, in constantly increasing amount as the free end 171 is depressed, by any biasing means suitable for that purpose, such as a biasing means utilized for that purpose in an ordinary scale.

On the other hand, while the coordination of the factors governing the relative extent of solidification of the metal, and the operation of the mill, and the characteristics of the strip, may be controlled manually, and by control of the depth of the lake responsive to an indication of the torque required to operate the mill, the coordination also may be effected automatically, and in this connection, may be effected conveniently by controlling the speed at which the mill operates.

Figure 18:
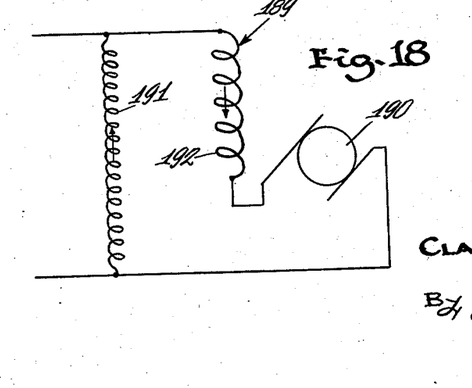
Figure 18 illustrates a motor adapted to vary its speed automatically in response to the required torque; while—

For example, I may drive the mill by the differential series field compound motor 189 disclosed in Figure 18 and comprising an armature 190 acting under the influence of the field resulting from the combined action of a shunt coil 191 and of a series coil 192 wound to set up a field opposite in direction to the field generated by the shunt coil 191, whereby, increase in current through the motor 189, resulting from increase in torque required to operate the mill, caused by excessive extent of solidification, by increase in the reverse series field automatically will decrease the resultant field and increase the speed of the motor 189 and of the mill, to decrease the extent of solidification, whereas decrease in torque required to drive the mill, resulting from decrease in the extent of solidification, will decrease the current through the motor 189, to decrease the field generated by the series coil 192, to increase the resultant field, and thus to decrease the speed of the motor 189 and of the mill, and thereby, to increase the extent of solidification. The extent of the action of the series field of course will be limited, as is well known in the art, to prevent preponderance of the series field under any operating conditions.

With a motor of this type, effecting control automatically, it is necessary only to coordinate initially for the nature of the metal and the width of the bight, after which the motor 189, properly constructed, will maintain the coordination automatically.

Figure 19:
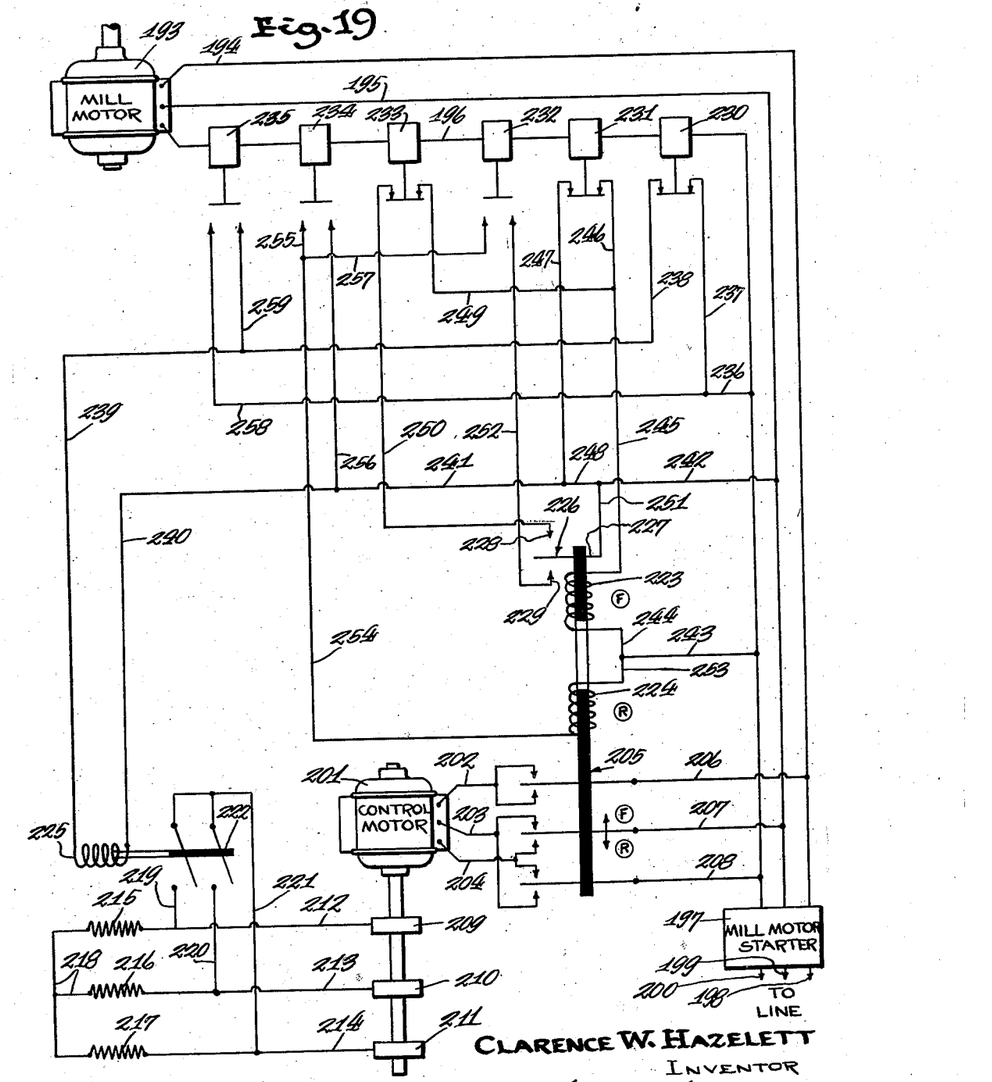
Figure 19 illustrates a control system adapted to effect the same result.

However, under many circumstances it is not desirable to vary the speed of operation of the mill, but on the contrary, is desirable to maintain the mill at constant speed, and to control some other factor governing the extent of solidification of the metal, and in those circumstances I may secure automatic control by means of the control mechanism disclosed in Figure 19.

In Figure 19 I have shown a main mill motor 193, which may be a three-phase squirrel-cage induction motor, connected by conductors 194 and 195 and 196 to a mill motor starter 197 fed from line wires 198 and 199 and 200 and of any type suitable for the purpose. The control means of Figure 19 also comprises a control motor 201 of the three-phase wound-rotor induction type, connected by means of conductors 202 and 203 and 204 to a reversing and control switch 205 which in turn is connected to the line wires 198 and 199 and 200 by means of connecting conductors 206 and 207 and 208 and is operative in its upper position to connect the control motor 201 for operation in one direction, and in its lower position to connect the control motor 201 for operation in the reverse direction, as will be understood from the diagram of connections.

Mounted on the shaft of the control motor 201 are three slip rings 209 and 210 and 211, connected to the rotor winding as is well known in the art, and engaged by brushes, not shown, connected to conductors 212 and 213 and 214 leading to resistances 215 and 216 and 217 connected together at their opposite ends by a T-conductor 218, whereby the control motor 201 operates normally with the resistances 215 and 216 and 217 interposed in the armature circuit. However, leading from the conductors 212 and 213 and 214 connecting the slip rings 209 and 210 and 211 to the resistances 215 and 216 and 217 are conductors 219 and 220 and 221 leading to a normally open switch 222 adapted to connect together the conductors 219 and 220 and 221, to short circuit the resistances 215 and 216 and 217, to remove these resistances from the armature circuit of the motor 201, thus to short circuit the armature of the motor 201, to correspondingly increase the speed of the motor 201, whenever the speed switch 222 is closed.

The control switch 205 is moved to forward position by means of a forward solenoid 223, and to reverse position by means of a solenoid reverse 224, and the speed switch 222 is moved to closed position by a solenoid 225, while the switch 205 includes also an auxiliary switch 226, comprising a contact arm 227 adapted to engage with a forward contact 228 when the control switch 205 is in forward position, and with a reverse contact 229 when the control switch 205 is in reverse position.

Interposed in the conductor 196 from the mill motor starter 197 to the mill motor 193 are a series of relays 230, 231, 232, 233, 234, and 235, responsive to current flowing in the conductor 196, and set to operate at progressively increasing values, in the order named, the relays 230 and 231 and 233 being in the nature of overload relays, each opening on the passage of current in excess of the value predetermined for that relay, and the relays 232 and 234 and 235 being in the nature of under-load relays, each closing on the passage of current of a value greater than that predetermined for that relay.

Under these circumstances, with the mill motor starter 197 in the off position, the relays 230 and 231 will be in closed position, the relay 232 will be in open position, the relay 233 will be in closed position, and the relays 234 and 235 will be in open position, and this condition will continue until the current in the line 196 reaches a value in excess of the predetermined value at which the relay 230 will operate.

Accordingly, when the mill motor starter 197 is closed current will flow not only to the mill motor 193 but also from the main conductor 196 through conductors 236 and 237, the switch of the relay 230, conductors 238 and 239, the coil 225 of the speed switch 222, and conductors 240 and 241 and 242, back to the main conductor 195, thus energizing the coil 225, to close the speed switch 222, to short circuit the resistances 215 and 216 and 217 in the armature circuit of the control motor 201, to connect the control motor 201 for operation at the maximum speed. Simultaneously, the relay 231 also being closed, current will flow from the main conductor 196 through conductors 243 and 244, the forward coil 223 of the control switch 205, conductors 245 and 246, the switch of the relay 231, conductors 247 and 248, and conductor 242, back to the main conductor 195, to energize the forward coil 223 of the control switch 205, to move the control switch 205 into the forward position, and to connect the control motor 201 to operate forwardly, and by reason of the fact that the speed switch 222 is closed, to operate at maximum speed. Directly the control switch 205 has moved into the upper or forward position the switch arm 227 of the auxiliary switch 226 will engage the forward contact 228, and this will close a second circuit through the forward coil 223 of the control switch 205, extending from the main conductor 196 through the conductors 243 and 244, the coil 223 of the control switch 205, the conductor 245, a conductor 249, the switch of the relay 233, a conductor 250, the auxiliary switch contact 228 and the auxiliary switch arm 227, a conductor 251, and the conductor 242, back to the main conductor 195.

As the current in the conductor 196 increases, the relay 230 will open, to open the circuit through the coil 225 of the speed switch 222, to interpose the resistances 215 and 216 and 217 in the armature circuit of the control motor 201, to reduce the speed of operation of the control motor 201. Then, as the current in the conductor 196 increases further, the relay 231 will open, to interrupt the circuit through the forward coil 223 of the control switch 205 by way of the switch of the relay 231, but this will be ineffective, by reason of the fact that the circuit through the coil 223 is also completed through the switch of the relay 233. As the current in the main conductor 196 increases still further, the relay 232 will operate to close its switch, but this also will be ineffective, because of the fact that by the conductor 252 the relay 232 is in series with the auxiliary switch 226 of the control switch 205, and that the arm 227 of the auxiliary switch 226 is in forward position, in engagement with the forward contact 228, rather than in reverse position, in engagement with the reverse contact 229, to which the switch of the relay 232 is connected.

However, as the current in the main conductor 196 increases still further, it reaches the value predetermined for the relay 233, and the relay 233 opens, interrupting the last circuit through the forward coil 223 of the control switch 205, to permit the control switch 205 to return to neutral position, under the action of biasing means of any suitable type, not shown. It will be noted, however, that this still does not bring the switch arm 227 of the auxiliary switch 226 into contact with the reverse contact 229, so that the fact that the switch of the relay 232 is closed still is of no consequence.

However, as the current in the main conductor 196 increases still further, the relay 234 operates, to close its switch, and a circuit is then completed from the main conductor 196 through the conductor 243, a conductor 253, the reverse coil 224 of the control switch 205, conductors 254 and 255, the switch of the relay 234, a conductor 256, and the conductors 241 and 248 and 242, back to the main conductor 195, to energize the reverse coil 224 of the control switch 205, to move the control switch 205 into reverse position, to connect the control motor 201 for operation in the reverse direction. When the control switch 205 is thus moved to reverse position the switch arm 227 of the auxiliary switch 226 contacts the reverse contact 229, and this completes a second circuit through the reverse coil 224 of the control switch 205, extending from the main conductor 196 through the conductors 243 and 253, the reverse coil 224 of the control switch 205, the conductor 254, a conductor 257, the switch of the relay 232, the conductor 252, the contact 229, the auxiliary switch arm 227, and the conductors 251 and 242, back to the main conductor 195.

If the current in the main conductor 196 continues to increase, and reaches the value predetermined for the relay 235, the switch of the relay 235 will be closed, to complete a circuit from the main conductor 196 through the conductor 236, a conductor 258, the switch of the relay 235, a conductor 259, the conductor 239, the coil 225 of the speed switch 222, and conductors 240 and 241 and 248 and 242, back to the main conductor 195, to again energize the coil 225 of the speed switch 222, to close the speed switch 222, to short circuit the resistances 215 and 216 and 217 in the armature circuit of the control motor 201, to set the control motor 201 operating again at full speed, but this time in the reverse direction.

However, if the current in the main conductor 196 decreases instead of increasing, it first will drop below the predetermined value for the relay 234, and the relay 234 will open, to open the circuit through the reverse coil 224 of the control switch 205 by way of the switch of the relay 234, but this will be immaterial, since an alternative circuit is closed through the reverse coil 224 of the control switch 205, by way of the switch of the relay 232. As the current in the main conductor 196 decreases further, the switch of the relay 233 will close, but this also will be immaterial, because the switch of the relay 233 is in series with the forward contact 228 of the auxiliary switch 226, and the switch arm 227 of the auxiliary switch 226 is in engagement with the reverse contact 229 rather than with the forward contact 228.

However, if the current decreases still further, the relay 232 will operate, to open its switch, and this will break the second circuit through the reverse coil 224 of the control switch 205, and the control switch 205 will return to neutral position, to disconnect the control motor 201.

Thereafter, increase in current in the main conductor 196 will repeat the cycle heretofore described, while further decrease in current in the main conductor 196 will again close the switch of the relay 231, to again close the circuit through the forward coil 223 of the control switch 205, to operate the control motor 201 in the forward direction, until the current in the main conductor 196 exceeds the predetermined value for operation of the relay 233, either with or without operation of the relay 230 to throw the control motor 201 into full speed, according to whether or not the current in the main conductor 196 falls below the value predetermined for operation of the relay 230.

Under these circumstances we have the situation that when the current to the mill motor 193 falls below the value predetermined for the relay 231 the control motor 201 operates in a forward direction until such time as the current to the mill motor 193 exceeds the value predetermined for the second succeeding relay 233, and then rests, until the current to the mill motor 193 either again drops below the value predetermined for the relay 231, in which case this cycle is repeated, or rises above the value predetermined for the relay 234, in which case the control motor 201 is operated in the reverse direction, until the value of the current to the mill motor decreases to below the value predetermined for the intermediate relay 232, whereupon the control motor again rests, until the current to the mill motor 193 again rises above the value predetermined for the relay 234, in which case the control motor is again actuated in the reverse direction, or alternatively, again falls below the value predetermined for the relay 231, in which case the control motor 201 is again actuated in the forward direction. With this addition, that upon excessive departure from normal the relays 230 and 235 are brought into play, to short circuit the resistances in the armature circuit of the control motor 201, to increase the speed of the control motor 201, to expedite the return to normal.

I have heretofore pointed out that the torque required to drive the mill follows the extent of solidification relative to the spacing of the rolls, and of course the current required by the mill motor 193 follows the torque required to drive the mill, wherefore, the current in the main conductor 196, acting on the relays 230 and 231 and 232 and 233 and 234 and 235, with any given metal, and with any given spacing of the rolls, and with calibration accordingly, follows the extent of solidification of the metal, and the extent of solidification of the metal therefore may be maintained constant automatically, merely by suitably connecting the control motor 201 to any one or more means controlling one or more of the factors governing the extent of solidification.

For example, I may connect the control motor 201 through suitable gearing to the furnace 50, to control the pouring of the metal from the furnace 50 into the trough 62, or I may connect the control motor 201 to the valves 112 controlling the supply of cooling water to the rolls, but whatever arrangement is employed, the control means of Figure 19, properly set to correspond to the nature of the metal being worked, and the width of the bight, will automatically coordinately vary any one or more of the factors governing the extent of solidification, automatically to maintain constant the characteristics of the continuous strip emerging from the mill.

And of course, while I have described the apparatus herein illustrated with particular reference to the combination where the extent of solidification is greater than the width of the bight of the rolls, so that a rolled strip is secured, the apparatus herein shown may in large part be utilized as well for strip having other characteristics, such as that produced when the extent of solidification is not greater than the width of the bight, and the strip is cast.

However, operating the mill to produce a rolled strip, I obtain strip far superior to chemically identical strip in which solidification preceded mechanical working by any usual time or temperature interval.

One plausible explanation of these facts is that at the instant of solidification of any molten metal the rate of growth of crystalline structure, expressed in terms of fixity of relations between individual atoms or groups of atoms, is a maximum at the outset, but decreases very rapidly. This is believed to hold true with respect to both time and temperature. In other words, the rate of the growth of crystalline microstructure is a function of both temperature and time.

The process disclosed causes mechanical distortion to operate on grain size at times and temperatures approximating those of the instant of solidification much more closely than in any other process of which I am aware. Furthermore, when solidification completes the bridging of the space between the two rolls, as at 24 in Figure 2, and every portion of the metal is instantaneously subjected to mechanical deformation, the beginning of deformation not only is coincident with the first occurrence of ability to receive mechanical stress, but acts in the first instance on a body of material having a steep temperature gradient from the center to each outer surface. The hotter weaker central portions that will be at least accessible to mechanical deformation by later rolling, either hot or cold, suffer the major part of the mechanical deformation throughout the entire rolling action, and thereafter no temperature gradient approximating the initial gradient ever can be obtained.

Whether the foregoing theory is correct or not, the fact is that material prepared as herein disclosed has ductility and homogeneity superior to the identical metal either hot rolled or cold rolled, and to such an extent as to permit a significant extension of the fields of use of such materials. For instance, brasses prepared in this way can be subjected to drawing operations more severe than were previously possible, and after drawing exhibit a much higher freedom from cracking, and a much superior surface finish.

In the preparation according to the invention of alloys capable of hardening and tempering by heat treatment, it is possible to cool the outer surfaces below one or more of the transformation points of the material during the initial formation of the strip. Obviously this amounts to simultaneous solidification, temperature transformation, and mechanical deformation, thus accomplishing in a single momentary operation what heretofore has required at least two separate operations. I believe that it results also in outstanding improvements in the micro-structure, and in symmetry of the resulting product, effecting improvement of the product of significance even greater than that of the elimination of the additional operation or operations.

From the foregoing it will be obvious that I have accomplished at least the principal objects of my invention, but at the same time it also will be obvious that the disclosure herein is illustrative only, and that my invention is not limited thereto.

Having now particularly described and ascertained the nature of my said invention, and in what manner the same is to be performed, I declare that what I claim is:

1. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and adding more heat to the zones adjacent to the dams than to the intermediate zones to control the thermal conditions so that the temperature of the solidified metal at the bight of the rolls is substantially the same in the zones adjacent to the dams and the intermediate zones of the molten bath.

2. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and controlling the thermal conditions so that the temperature of the solidified metal at the bight of the rolls is substantially the same in the zones adjacent to the dams and the intermediate zones by regulating the amount of heat supplied to the various zones of the bath.

3. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and controlling the thermal conditions so that the temperature of the solidified metal at the bight of the rolls is substantially the same in the zones adjacent to the dams and the intermediate zones of the molten bath; the said controlling operation involving introducing a larger amount of molten metal to those regions of the bath adjacent to the dams at the end of the rolls whereby compensation is made for excess cooling of said dams.

4. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; rotating said rolls to cause the ejection of solidified metal from the bight of the rolls; and controlling the thermal conditions so that the temperature of the solidified metal at the bight of the rolls is substantially the same in the zones adjacent to the dams and the intermediate zones of the molten bath; the said controlling operation involving the regulation of the heat supplied to the ends of the rolls and associated dams whereby compensation is effected for excess cooling of the ends of the rolls and/or dams, and whereby the solidification of excessive solid metal at the ends of the rolls is avoided.

5. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and providing the ends of the dams with a lower heat conductivity than the central zones of the rolls to control the thermal conditions so that the temperature of the solidified metal at the bight of the rolls is substantially the same in the zones adjacent to the dams and the intermediate zones of the molten bath.

6. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and providing dams with lower heat conductivity than the rolls to control the thermal conditions so that the temperature of the solidified metal at the bight of the rolls is substantially the same in the zones adjacent to the dams and the intermediate zones of the molten bath.

7. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and expanding the cross section of the metal solidified at the ends of the rolls gradually and outwardly to form an expanded wedge shape attached to and intended to form sides of the solidified metal to control the thermal conditions so that the temperature of the solidified metal at the bight of the rolls is substantially the same in the zones adjacent to the dams and the intermediate zones of the molten bath.

8. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and spraying less water at the ends of the rolls than at the intermediate zones of the rolls to control the thermal conditions so that the temperature of the solidified metal at the bight of the rolls is substantially the same in the zones adjacent to the dams and the intermediate zones of the molten bath.

9. The method of producing solid metal of substantially constant cross section throughout its length directly from a mass of molten metal which comprises establishing a bath of molten metal between a pair of adjacent and operatively associated rolls; providing a dam at each end of the rolls to maintain the molten metal in said bath; maintaining said molten metal to a selected height in said bath; rotating said rolls to cause the ejection of solidified metal from the bight of the rolls; and applying a heat insulating material to the dams to control the thermal conditions so that the temperature of the solidified metal at the bight of the rolls is substantially the same in the zones adjacent to the dams and the intermediate zones of the molten bath.

10. The method of producing solid metal of substantially constant cross section throughout its length directly from a mass of molten metal which comprises establishing a bath of molten metal between a pair of adjacent and operatively associated rolls; rotating said rolls to cause the ejection of solidified metal from the bight of the rolls; maintaining said molten metal to a selected height in said bath; and regulating the power input applied to the rolls to not less than one horse power per foot of width of metal per foot per minute of peripheral speed of advance of the solidified metal to and through the bight of the rolls.

11. The method of producing solid metal of substantially constant cross section throughout its length directly from a mass of molten metal which comprises establishing a bath of molten metal between a pair of adjacent and operatively associated rolls; rotating said rolls to cause the ejection of solidified metal from the bight of the rolls; maintaining said molten metal to a selected height in said bath; and regulating the temperature in the molten bath in accordance with changes shown by a meter associated with the driving means for said rolls whereby the said temperature is increased with increases of said meter and is decreased with decreases of said meter.

12. The method of producing solid metal of substantially constant cross section throughout its length directly from a mass of molten metal which comprises establishing a bath of molten metal between a pair of adjacent and operatively associated rolls; rotating said rolls to cause the ejection of solidified metal from the bight of the rolls; maintaining said molten metal to a selected height in said bath; and adding molten metal to said molten bath in amounts depending upon indications of a meter associated with the driving means for said rolls whereby the said amounts are increased with decreases in the indications of said meter and are decreased with increases in the indications of said meter.

13. The method of producing solid metal of substantially constant cross section throughout its length directly from a mass of molten metal which comprises establishing a bath of molten metal between a pair of adjacent and operatively associated rolls; rotating said rolls to cause the ejection of solidified metal from the bight of the rolls; maintaining said molten metal to a selected height in said bath; adding molten metal to said bath; and varying said additions of molten metal with changes indicated by a torque indicator operatively associated with the said rolls whereby the additions are increased with decreases in the said indications of said indicator and are decreased with increases in the indications of said meter.

14. The method of producing solid metal of substantially constant cross section throughout its length directly from a mass of molten metal which comprises establishing a bath of molten metal between a pair of adjacent and operatively associated rolls; providing a moving dam at each end of the rolls to maintain a bath of molten metal; maintaining said molten metal to a selected height in said bath; rotating said rolls to cause the ejection of solidified metal from the bight of the rolls; and regulating the depth of the bath to a height more than the distance that the molten metal falls freely plus any static head of molten metal being fed to the bath whereby detrimental eddies of incoming molten metal are not created and solidified metal adjacent to the surface of the rolls and to the bight thereof is not detrimentally affected.

15. The method of producing solid metal of substantially constant cross section throughout its length directly from a mass of molten metal which comprises establishing a bath of molten metal between a pair of adjacent and operatively associated rolls; providing a moving dam at each end of the rolls to maintain a bath of molten metal in said bath; maintaining said molten metal to a selected height in said bath; rotating said rolls to cause the ejection of solidified metal from the bight of the rolls; introducing a stream of molten metal into said bath; and dividing the said stream at a region closer to the surface of the bath than the depth thereof whereby detrimental eddies of incoming molten metal are not created and solidified metal adjacent to the surface of the rolls and to the bight thereof is not detrimentally affected.

CLARENCE W. HAZELETT.